3,397,238
PROCESS FOR THE PREPARATION OF ALKYL ETHERS OF AMINO-ALCOHOLS
Donald C. Hobbs, Niantic, Conn., assignor to Chas. Pfizer & Co., Inc., New York, N.Y., a corporation of Delaware
No Drawing. Filed Nov. 16, 1965, Ser. No. 508,147
4 Claims. (Cl. 260—584)

This invention relates to a new and useful process for the preparation of alkyl ethers of amino-alcohols. More particularly, we have unexpectedly found that the present process, which comprises reacting an alkanolamine with a dialkyl sulfate, permits the direct production of alkyl ethers of alkanolamines.

The alkyl ethers of amino-alcohols are useful industrial and pharmaceutical chemicals and intermediates. They are used in detergent formulations, as emulsifying agent, solvents, oxidation inhibitors in gasoline and lard, catalysts, as vasoconstrictors and as plasticizers in wax.

The older, well-known methods for preparing alkyl ethers of amino-alcohols involve a series of reaction steps which contribute to low yields and to the cost of the product. For example, in U.S. Patent 2,285,419, methoxyethylamine is prepared by reacting 2-methoxyethanol with ammonia at 200-250° C. in the presence of Raney nickel or alumina catalyst. In U.S. Patent 2,372,624, 3-methoxy-1-propylamine is prepared by reacting sodium methoxide with acrylonitrile and then hydrogenating the nitrile at 110° C. and 40 to 70 atmospheres using a Raney nickel catalyst. Other methods, reported in the literature, are: nitrating an alkyl ether and then reducing the nitro group with hydrogen over a platinum catalyst; reducing an alkyl ether nitrile, obtained by dehydrating an alkoxyamide or by reacting a nitrile group with an alkoxyalkyl halide, with sodium or by catalytic reduction over platinum; and a process wherein the amino group of an alkanolamine is acetylated, the alcohol group is alkylated and the protective acetyl group is hydrolyzed to yield the product. In contrast to these methods, the process of this invention offers a relatively simple and inexpensive procedure for directly alkylating a wide range of amino-alcohols to their alkyl ethers.

The present process is based on our discovery that alkyl ethers of amino-alcohols of the formula:

where $R_1$ is alkyl having from 1 to 4 carbon atoms and R is alkylene having from 2 to 10 carbon atoms, are producing by reacting a hydroxy-substituted alkanolamine of the formula:

where $R_2$ is as aforesaid, with a dialkyl sulfate such as dimethyl sulfate, diethyl sulfate, di-n-propyl sulfate and di-n-butyl sulfate in an aqueous medium at a pH of less than 1 and in the presence of from about 5 to about 75 weight percent of a lower alkanoic acid based on the total reaction mixture weight.

A preferred embodiment of the process of this invention comprises reacting an amino-alcohol having from 2 to 10 carbon atoms with a dialkyl sulfate selected from the group comprising dimethyl sulfate, diethyl sulfate, di-n-propyl sulfate and di-n-butyl sulfate. While less than a molar equivalent of dialkyl sulfate is operative in the process of this invention, an excess and preferably twice the molar equivalent is preferred for the reason that higher yields of product are produced. The reaction takes place in an aqueous medium maintained at a pH of less than 1. It will be appreciated by those skilled in the art that any acid having sufficiently low pKa will be effective in obtaining the proper acidity. However, mineral acids such as hydrochloric acid, nitric acid and sulfuric acid are preferred on the basis of availability and economy. We have found that the presence of a water-miscible fatty acid is necessary in this reaction. The amount of said acid should range from about 5 to about 75 weight percent based on the total reaction mixture weight including the fatty acid. The preferred concentration is from about 25 to about 30 weight percent acid based on the total reaction mixture weight. The water-miscible fatty acids useful in the process of this invention are lower alkanoic acids and include formic acid, acetic acid, propionic acid, isobutyric acid and butyric acid. Acetic acid is preferred on the basis of economy. The reaction temperature is not critical, however it has been found that temperatures between −10° C. and +25° C. give preferred results. Temperatures below −10° C. are inconvenient, except in the laboratory and temperatures above +25° C. result in the evolution of noxious fumes requiring special handling. The reaction time depends, of course, on the size of the run. Alkylation of one gram mole of alkanolamine will ordinarily require about one hour followed by an additional two hours stirring to complete the reaction. The product is recovered from the reaction mixture most effectively by distilling off the bulk of the water and fatty acid under vacuum, diluting the residue with water and making the residue alkaline with a strong base such as 10 N sodium hydroxide. The mixture is concentrated by distillation, diluted with methanol and filtered to remove inorganic salts. Distillation of the filtrate yields the alkyl ethers of the amino-alcohol. Other methods of separating and purifying the product, such as by absorption chromatography are also effective.

The following examples are illustrative of the process of this invention. They are not to be construed as limiting its scope in any manner whatsoever.

Example I.—2-methoxyethylamine

To 10.0 grams (0.16 mole) of ethanolamine in 50 ml. of 6 N hydrochloric acid and 50 ml. of glacial acetic acid at 0° C., is added slowly 25 ml. (0.27 mole) of dimethyl sulfate over a 30 minute period. The temperature is allowed to rise to 25° C. and a further 25 ml. of dimethyl sulfate is added. The reaction is allowed to stir for 2 hours at 25° C. and the bulk of the water and acetic acid is removed by distillation in vacuo. The addition of 100 ml. of water to the residue yields 6.05 grams of crystalline material which is removed by filtration. The filtrate is made alkaline with 10 N sodium hydroxide and distilled to yield 5.1 grams of an aqueous solution of 2-methoxy-ethylamine.

When the procedure is repeated without glacial acetic acid, a small amount of unreacted ethanolamine is recovered in the distillate and no 2-methoxyethylamine is recovered.

Example II

The procedure of Example I is repeated substituting 50 ml. of 5 N sulfuric acid for 50 ml. of 6 N hydrochloric acid to obtain products identical therewith.

Example III.—3-methoxy-n-propylamine

To 10 grams (0.15 mole) of 3-amino-n-propanol in 50 ml. of 6 N hydrochloric acid and 50 ml. of glacial acetic acid at −10° C. is added slowly 25 ml. (0.27 mole) of dimethyl sulfate over a 30 minute period. The temperature is allowed to rise to 25° C. and an additional 25 ml. of dimethyl sulfate is added. The mixture is allowed to stir for 2 hours at 25° C. and the water and acetic acid are removed by distillation under 10 mm. Hg pressure. The residue is diluted with 50 ml. water and made alkaline with 10 N sodium hydroxide. Thirty ml. of water are distilled from the mixture in vacuo. The residue is diluted with 30 ml. of methanol. Distillation of the filtrate yields 3.59 grams of 3-methoxy-n-propylamine, B.P. 119–121° C./760 mm. Hg (lit. 117–118° C./733 mm. Hg). Yield is 30% of theoretical.

Example IV

The procedure of Example III is repeated substituting 50 ml. of 5 N nitric acid for 50 ml. of 6 N hydrochloric acid to obtain products identical therewith.

Example V.—3-ethoxy-n-propylamine

To 10 grams (0.13 mole) of 3-amino-n-propanol in 50 ml. 6 N hydrochloric acid and 5.0 ml. glacial acetic acid at 25° C., is added slowly 50 grams (0.33 mole) of diethyl sulfate over a 60 minute period. The mixture is allowed to stir for 2 hours and the water and acetic acid are removed by distillation in vacuo. The residue is diluted with 50 ml. water and made alkaline with 10 N sodium hydroxide. Thirty ml. of water are distilled from the mixture by distillation in vacuo. The residue is diluted with 30 ml. methanol and distilled to yield 3-ethoxy-n-propylamine.

Example VI.—3-n-butoxypropylamine

To 10 grams (0.13 mole) of 3-amino-n-propanol in 50 ml. of 6 N hydrochloric acid and 50 ml. glacial acetic acid at −10° C. is added slowly 40 grams (0.19 mole) of di-n-butyl sulfate over a 30 minute period. The temperature is allowed to rise to 25° C. and an additional 40 grams of di-n-butyl sulfate is added. The mixture is allowed to stir for 2 hours and the water and acetic acid are distilled from the mixture under vacuum. The residue is diluted with 50 ml. water and made alkaline with 10 N sodium hydroxide. Thirty ml. of water are distilled from the mixture in vacuo. The residue is diluted with 30 ml. methanol and distilled to yield 3-n-butoxypropylamine.

Example VII.—10-methoxy-n-decylamine

To 20 grams (0.12 mole) 10-amino-decanol-1 in 100 ml. of 6 N hydrochloric acid and 50 ml. of glacial acetic acid at 0° C. is added slowly 25 grams (0.2 mole) of dimethyl sulfate over a 30 minute period. The temperature is allowed to rise to 25° C. and an additional 25 grams of dimethyl sulfate is added. The mixture is allowed to stir for 2 hours at 25° C. and the bulk of the water and acetic acid are removed by distillation at 10 mm. Hg pressure. The residue is diluted with 50 ml. water and made alkaline with 10 N sodium hydroxide. Forty ml. of water are distilled from the mixture in vacuo. The residue is diluted with 30 ml. methanol. Distillation of the filtrate yields 10-methoxy-n-decylamine.

Example VIII.—10-n-butoxy-n-decylamine

To 20 grams (0.12 mole) 10-amino-decanol-1 in 100 ml. of 6 N hydrochloric acid and 50 ml. of glacial acetic acid at −10° C. is added slowly 40 grams (0.19 mole) of di-n-butyl sulfate over a 30 minute period. The temperature is allowed to rise to 25° C. and an additional 40 grams of di-n-butyl sulfate is added. The mixture is allowed to stir for 2 hours and the bulk of the water and acetic acid are distilled from the mixture under vacuum. The residue is diluted with 50 ml. water and made alkaline with 10 N sodium hydroxide. Thirty ml. of water are distilled from the mixture under vacuum. The residue is diluted with 30 ml. methanol and distilled to yield 10-n-butoxy-n-decylamine.

What is claimed is:

1. A process for preparing a compound of the formula:

$$R_1-O-R_2-NH_2$$

wherein $R_1$ is alkyl having from 1 to 4 carbon atoms and $R_2$ is alkylene having from 2 to 10 carbon atoms, which comprises reacting an hydroxy-substituted alkylamine of the formula:

$$HO-R_2-NH_2$$

wherein $R_2$ is as aforesaid, with a dialkyl sulfate selected from the group consisting of dimethyl sulfate, diethyl sulfate, di-n-propyl sulfate, and di-n-butyl sulfate in an aqueous medium at a pH of less than 1 and in the presence of from about 5 to about 75% by weight of a lower alkanoic acid based on the total reaction mixture weight.

2. A process according to claim 1 wherein the lower alkanoic acid is acetic acid.

3. A process according to claim 1, wherein the reaction is conducted at from about −10° C. to about +25° C.

4. A process according to claim 1 wherein the dialkyl sulfate is dimethyl sulfate and the lower alkanoic acid is acetic acid.

References Cited

UNITED STATES PATENTS 2,372,624   3/1945   Carpenter  260—584

CHARLES B. PARKER, *Primary Examiner.*

R. L. RAYMOND, *Assistant Examiner.*